United States Patent [19]
Osborn

[11] Patent Number: 6,022,116
[45] Date of Patent: *Feb. 8, 2000

[54] REMOVABLE MIRROR FOR REAR OF VEHICLE

[76] Inventor: Edward Osborn, 12526 Maria Cir., Broomfield, Colo. 80020

[ * ] Notice: This patent issued on a continued prosecution application filed under 37 CFR 1.53(d), and is subject to the twenty year patent term provisions of 35 U.S.C. 154(a)(2).

[21] Appl. No.: 08/799,093

[22] Filed: Feb. 11, 1997

[51] Int. Cl.$^7$ .................................................. G02B 7/182
[52] U.S. Cl. ...................... 359/872; 359/873; 359/874; 359/875; 359/876
[58] Field of Search ..................................... 359/872, 873, 359/874, 875, 876; 248/467, 472, 477, 484, 495, 497

[56] References Cited

U.S. PATENT DOCUMENTS

| | | |
|---|---|---|
| 4,925,287 | 5/1990 | Lord et al. ............................... 359/872 |
| 5,784,213 | 7/1998 | Howard . | |

*Primary Examiner*—Cassandra Spyrou
*Assistant Examiner*—Mohammad Y. Sikder
*Attorney, Agent, or Firm*—Ramon L. Pizarro; Edwin H. Crabtree

[57] ABSTRACT

A support device for temporarily supporting a mirrored surface from flat or uneven surfaces on a tow vehicle, the tow vehicle having a towing coupling, the device being temporarily mountable near the tow attachment in order to allow the viewing of the towing coupling while connecting the towing coupling to an object to be towed. The support device includes a mirror, a support for holding the mirror about an axis. The support being connected a first leg having a first section and a second section, the first section being connected to the second section by a hinge that allows pivoting of the first section relative to the second section from a first position where the second section is proximate to the mirror and a second position where the second section extends away from the mirror, the first section being releaseably attachable to the axial support. The second section further includes a support for attaching the second section to a surface of the tow vehicle. A second leg having a first section, and a second section, the first section being connected to the second section by a hinge means that allows pivoting of the first section relative to the second section from a position where the second section is proximate to the mirror and a second position where the second section extends away from the mirror, the first section being releaseably attachable to the axial support, and the second section also having support means for attaching the second section to a surface of the tow vehicle may be accepted between the first support point and the second support point.

16 Claims, 6 Drawing Sheets

REMOVABLE MIRROR FOR REAR OF VEHICLE

BACKGROUND OF THE INVENTION (a) Field of the Invention

This invention generally relates to a mirror mounting system for removably, temporarily mounting a mirror at the rear of a vehicle in order to facilitate the positioning of the rear or hitch area of the vehicle near the hitch of the trailer, so that the trailer may be easily coupled to the rear of the vehicle.

(b) Discussion of Known Art

It is well recognized that when attaching a trailer to a vehicle it is advantageous to first place the trailer hitch on towing vehicle as near as possible to the mating portion on the trailer before connecting the trailer to the vehicle, without bumping the trailer. There are many reasons for this, some of which include the possibility of damaging the towing vehicle as well as the trailer by accidentally bumping into the trailer. Also, if the vehicle and trailer are left too far from one another, the mating section of the trailer, the tongue of the trailer, will have to be manually lifted and placed over the hitch on the vehicle. This procedure can easily lead to back injury to the individual trying to connect the trailer to the vehicle.

Importantly, when trying to connect to large, heavily loaded trailers on which the hitch or tongue cannot be manually moved into position, but still have to be precisely aligned before connecting to a towing vehicle. The fact that the towing vehicle must be moved into position means that the operator must typically make several attempts at positioning the towing vehicle into position before being able to properly connect the trailer to the towing vehicle. The need to make several attempts at positioning the towing vehicle wastes operator time, which can increase operating costs to businesses that must move a variety of trailers.

While the need to provide a device that allows the vehicle operator to manipulate the rear of the vehicle to an optional connection position has been recognized, there remains a need for a device that can be used with a large variety of vehicles and that can be easily stowed away when not in use. An example of the solutions in the known prior art include U.S. Pat. No. 5,482,310 to Staggs. The Staggs patent teaches the use of a mirror which is supported on a pair telescoping legs that mount to the rear of a vehicle by means of a magnet. The telescoping nature of the Staggs device requires that the legs be substantially parallel to one another. This parallel, telescoping structure limits the ability to collapse and stow the device when not in use. Also, the use of parallel legs limits the adaptability of the support structure, since the positions of the legs relative to the mirror can only be varied telescopically and radially. The structural limitation imposed by the parallel legs limit the use of the device to vehicles which provide a flat surface on which the magnetic base may be mounted. Also, the telescoping, parallel structure does not lend itself to optimal collapse and stowage, optimal stowage size being a size that approximates the size of the mirror surface.

Another example of a device that allows a user to view the hitch area while trying to attach a trailer to a vehicle is taught in U.S. Pat. No. 5,478,101 to Roberson. The Roberson device includes a magnetic base which supports a support structure with a generally O-shaped configuration. This configuration offers advantages in simplicity as well as compactness in size. However, the O-shaped support structure is even further limited in its adjustability as compared to the telescoping structure of the Staggs device. Thus, while the Roberson device offers several important advantages, it leaves unsolved significant problems with universal applicability and adjustability.

An important development in a trailer hitch alignment device is taught in U.S. Pat. No. 5,180,182 to Haworth. The Haworth device includes a pair of side panels with slots that have been adapted for receiving the tailgate on a pickup truck and a flat panel that supports a mirror between the two side panels. Perhaps the most serious limitations of the Haworth device is that it can only be used on vehicles that present an edge that is similar to the edge on a pickup tailgate or the window on the back o a station wagon or the like. Thus the Haworth device does not provide the versatility that is needed for a tool that is used for aligning a trailer hitch, since trailers are frequently towed by vehicles such as scrapers, pull carts, and fork lifts. Thus, the multitude of vehicles that are used for towing trailers require a truly versatile support structure for a reflective surface.

Other support structures, such as the structure taught in U.S. Pat. No. 4,951,913 to Quesada allows significant flexibility in that it provides slotted adjustments and a single pivot point for supporting the mirror surface. However, the Quesada device leaves the problems of versatility and collapsibility unanswered, or not fully addressed. This is largely due to the structure of the Quesada device requiring many components that cannot be conveniently collapsed. Also, the Quesada structure also requires the attachment to surfaces such are found on pickups or on station wagons or the like. These limitations are also found in the structure revealed in U.S. Pat. No. 4,905,376 to Neeley, which uses a U-shaped bracket to support a mirror surface.

Other devices for aiding in the alignment of trailer hitch connection components are taught in U.S. Pat. No. 5,328,199 to Howe, U.S. Pat. No. 5,309,289 to Johnson, and U.S. Pat. No. 4,552,376 to Cofer. These inventions are primarily attached to sections of the trailer, and thus do not offer the same advantages of collapsibility and ease of installation found in devices that mount temporarily to the towing vehicle.

Thus it is clear that there remains a need for a device that can be used with a variety of towing vehicles to allow the driver to see the hitch area while trying to connect a trailer.

It is also important to note that there remains a need for a device that can be used to temporarily support a mirror near the hitch area of a vehicle, and that can be collapsed to approximately the size of the mirror for easy stowage.

There remains a need for a simple device for temporarily supporting a mirror from near the hitch area of a vehicle, without having to engage in a significant number of adjustments in order to achieve proper viewing of the hitch area.

SUMMARY

It has been discovered that the problems of adjustability and collapsibility that had been left unsolved by the known prior art can be solved by providing a support device for temporarily supporting a mirrored surface from a variety of tow vehicles having a towing coupling, the device being temporarily mountable near the tow attachment in order to allow the viewing of the towing coupling while moving the towing coupling toward an object to be towed. The support device for the mirror including the following elements:

a) a mirror;

b) an axial support means for supporting said mirror about an axis;

c) a first leg that is divided into a first section, and a second section, said first section having a first end surface closer to said mirror, and a second end surface away from said mirror, said second section having a third end surface closer to said first section and a fourth end surface away from said first section, the first section being connected to the second section by a hinge that is mounted adjacent to said second end surface of the first section and said third end surface of said second section and cooperates with said second end surface and said third end surface to allow pivoting of the first section relative to the second section from a first position, where the second section is near the mirror said second end surface and said third end surface do not come in contact with each other, and a second position where the second section extends away from said mirror, and said second end surface and said third end surface come in contact with each other, the first section also being releaseably and pivotally attachable to the axial support, and a support attached to the second section, the support serving for attachment of the device to a surface; and d) a second leg which is independent from said first leg and that is divided into a first section, and a second section, said first section having a first end surface closer to said mirror, and a second end surface away from said mirror, said second section having a third end surface closer to said first section and a fourth end surface away from said first section, the first section being connected to the second section by a hinge that is mounted adjacent to said second end surface of the first section and said third end surface of said second section and cooperates with said second end surface and said third end surface to allow pivoting of the first section relative to the second section from a first position, where the second section is near the mirror and said second end surface and said third end surface come in contact with each other, and a second position where the second section extends away from said mirror, and said second end surface and said third end surface come in contact with each other, the first section also being releaseably and pivotally attachable to the axial support, and a support attached to the second section, the support serving for attachment of the device to a surface.

In a highly preferred embodiment of the invention the support that is attached to the second section of the legs and serves for attaching the device to a surface includes a first support point and a second support point, the first support point being spaced apart from the second support point, so that a surface of the tow vehicle may be accepted between the first support point and the second support point. On the first support point may be placed a magnet and the second support point may simply be of a material that will not harm the surface of the towing vehicle. It is important to note that the second support point will react compressive loads almost exclusively, and thus will typically require no additional frictional surfaces to keep the device from sliding. In the event that frictional support are desired, it is contemplated that a rubberized pad or the like may be attached to the second support point.

It is also contemplated that the second section of the legs may include a pair of forked supports that may accept an edge of a tailgate or a window. This embodiment will allow the user to benefit from many of the advantages and objects achievable with the collapsible legs that are taught as part of the present invention. However, due to the fact that many tow vehicles will not present an edge such as found on the tailgate of a truck, or the top of a window, it is contemplated that this embodiment will not be as versatile as where a magnet and a frictional support pad are used as the support means.

The use of an axial support to hold the mirror and to attach the legs helps provide the versatility achieved with the instant invention. The first sections of the legs releaseably attach to the axial supports in order to allow the user to selectively adjust the position of the first section of the legs relative to the mirror. Since the first section of the legs is in turn hingedly attached to the second section of the legs, the combined adjustability, which includes the adjustability of the first section relative to the axial support and the ability to pivot the second section of the legs relative to the first section due the hinged connection between the two sections of the legs, produces unexpected flexibility and collapsibility of the invention, without compromising the structure's ability to lend proper support for the mirror.

Thus it will become apparent that the resulting structure disclosed herein will produce a light, compact, inexpensive device that may be easily mounted and removed from a vehicle. Moreover, it will be understood that the device will allow the user to align the hitch components without having to leave the driver's seat or having to try to manually manipulate the hitch elements together. Still further, it will be understood that the instant invention will provide advantages in stowability that were not achievable with known devices.

It is important to note that the versatility of the invention is also enhanced by the structure that serves for attaching the device to a surface on the towing vehicle. Thus by including attachment structure that includes a first support point and a second support point, and on the first support point including a magnet one achieves versatility and compactness that was unachievable with known devices.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figures 1, 2, 3:
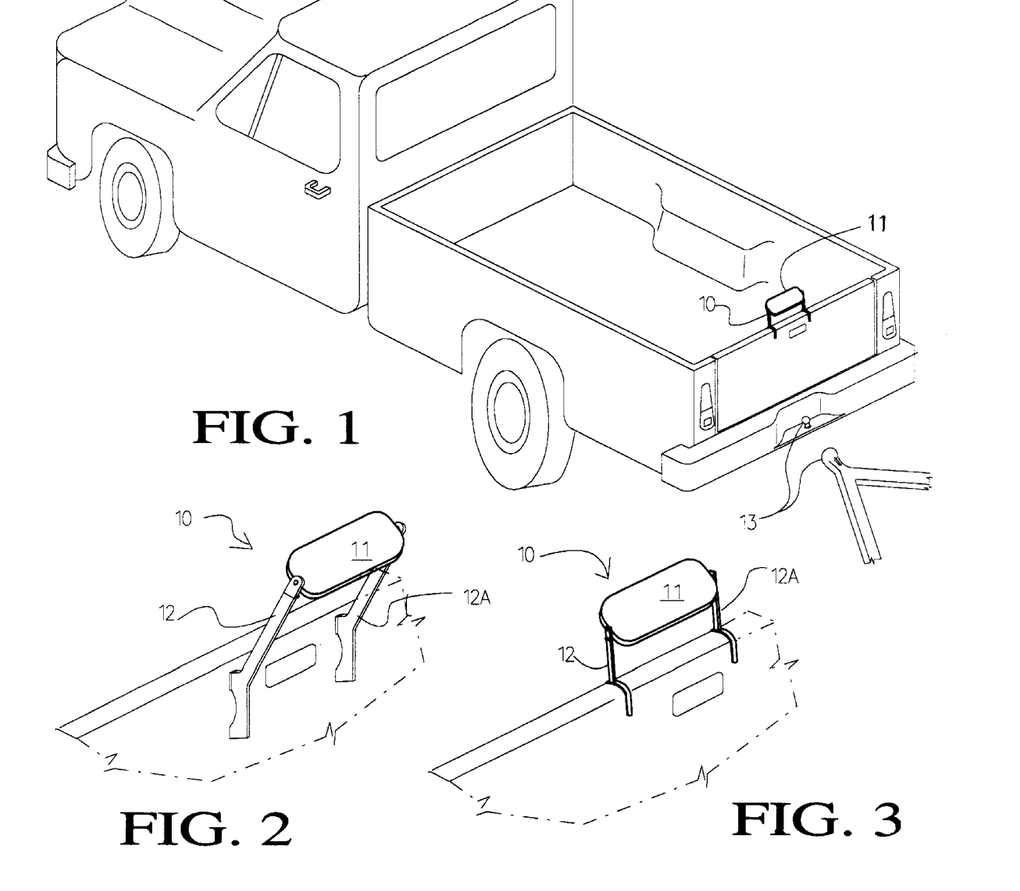
FIG. 1 shows a truck with an embodiment of the invention being used to align mating hitch members.
FIG. 2 is a perspective view of a preferred embodiment of the invention as used on the tailgate of a truck.
FIG. 3 is a perspective view of an embodiment of the invention as used on the tailgate of a truck.

Turning now to FIG. 1 which shows a truck with an embodiment of the instant invention 10, which allows the temporary placement of a mirror 11 on the vehicle in order to align mating hitch members 13. While it is contemplated that the instant invention may be used with a pickup truck or utility vehicle and an ordinary trailer, it is also contemplated that the instant invention be used with various kinds of vehicles that may be used to tow things. For example, as will become apparent from the following discussion, the instant invention will be useful in aiding a fork lift operator connect the a towing attachment on the fork lift to a trailer or cart to be pulled with the fork lift. Also, specialized tow vehicles, such as used to carry carts to and from airplanes or in and out of mine shafts may be used with the instant invention, since as will be described hereinbelow, the versatility provided by the structure of the instant invention will allow the invention to be mounted on any ferrous surface.

Figure 4:
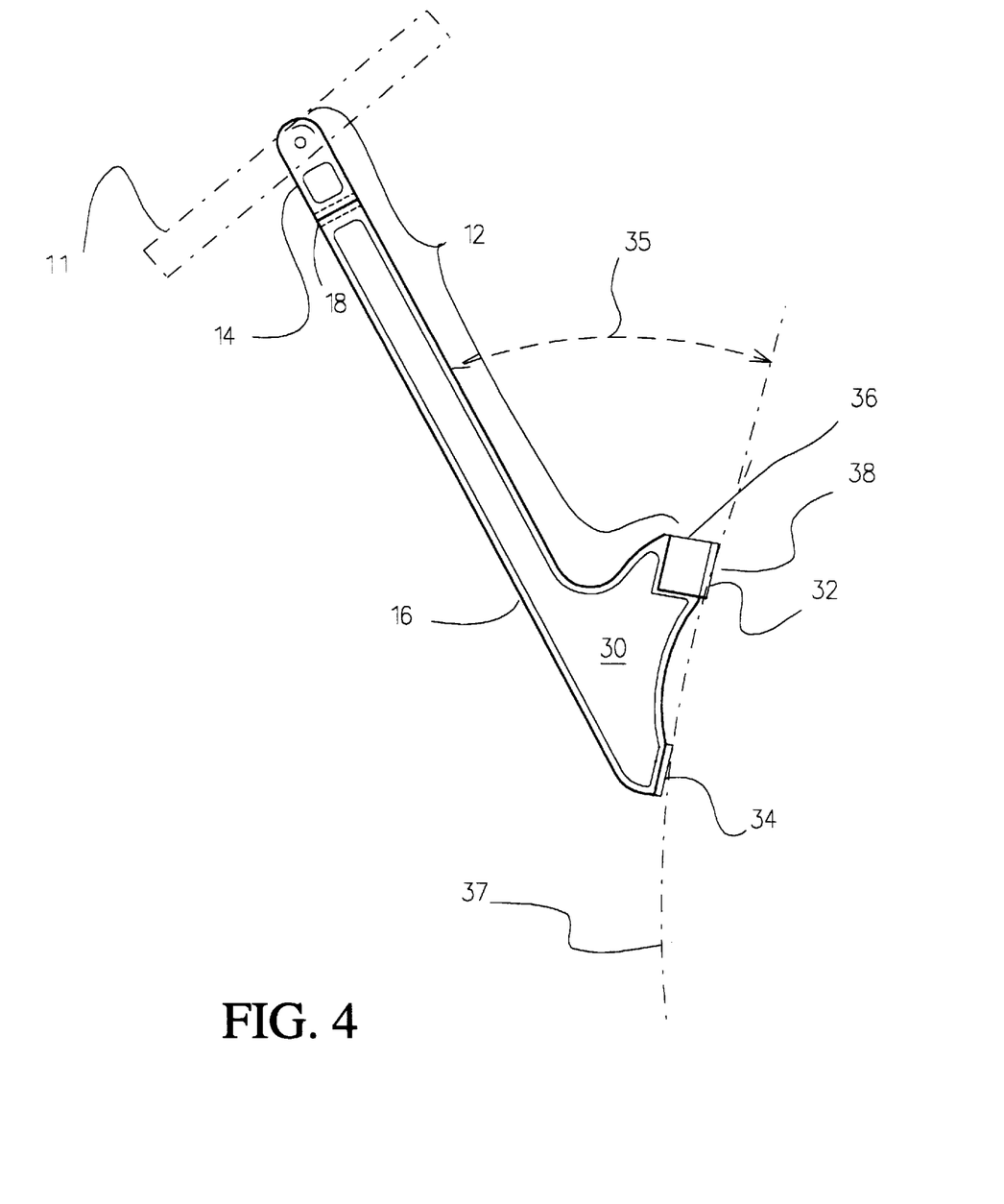
FIG. 4 is a side view of a preferred embodiment of one of the legs of the invention.

Turning now to FIGS. 2 through 5, and in particular to FIGS. 2 and 4, where a highly preferred embodiment of the legs 12 has been illustrated with the invention 10. From FIG. 4 it will be understood that the legs 12 include a first section 14, and a second section 16. The first section 14 is connected to the second section 16 by a hinge means 18 that allows pivoting of the first section 14 relative to the second section 16.

The hinge means 18 is preferably of the kind that includes a hinge pin that allows pivoting of the first section 14 relative to the second section 16 about a single axis. As shown on FIGS. 6 through 8 the hinge means 18 will preferably be integral with the side of the legs, so that the sections of the legs may be pivoted from a first position, shown on FIGS. 7 and 8, where the second section is proximate to the mirror, and a second position, shown on FIG. 6 and on figures illustrating the invention while mounted on a vehicle, where the second section extends away from said mirror.

Figure 6:
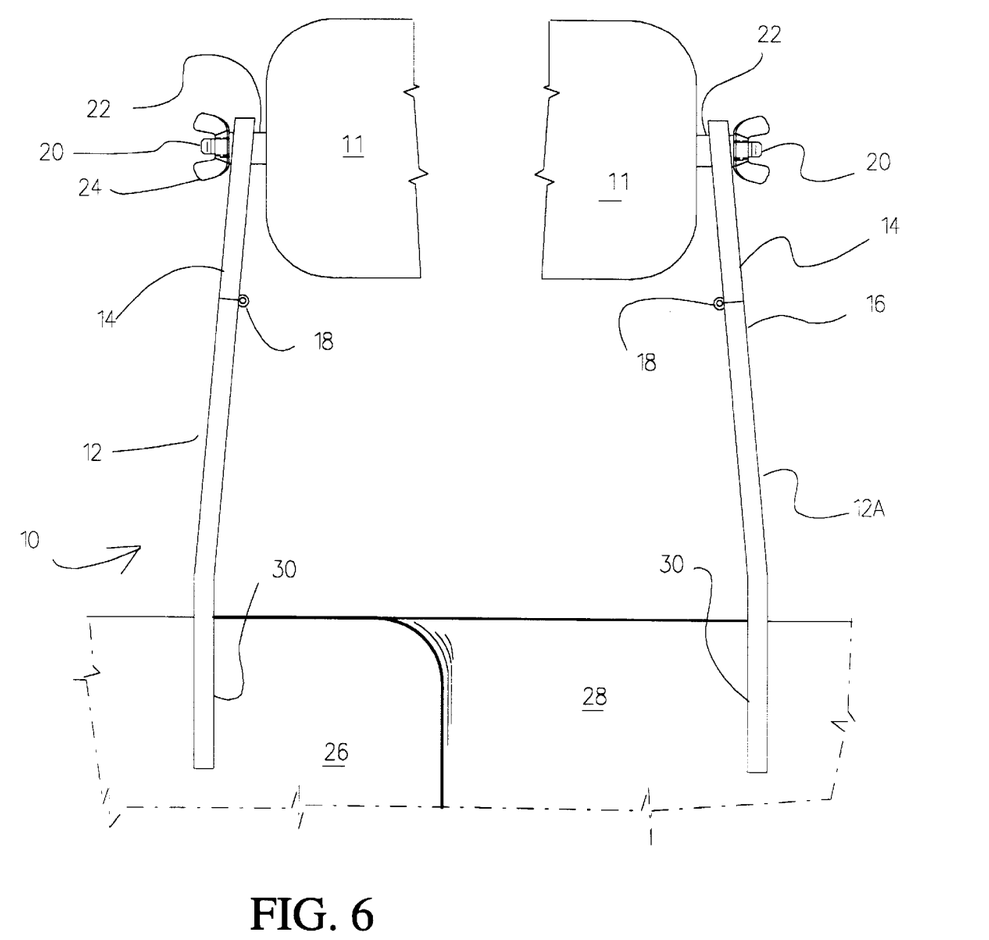
FIG. 6 is a rear elevational view of the invention as used to support the mirror on a structure having surfaces on two different planes.

As shown on FIG. 6, the mirror 11 includes an axial support means 20, which allows movement of the mirror 11 about an axis relative to the first section 14 of the legs 12. As has been illustrated in FIG. 6, the first section 14 of legs 12 is attached to the axial support means 20 by the use of a shoulder bolt 22 and a wing nut 24. The use of the shoulder bolt 20 and the wing nut 24 allow the first section 14 of the legs 12 to be releaseably attachable to said axial support means 20. Thus this attachment allows the adjustment of the position of the first section 14 of the leg 12 relative to the mirror 11. This adjustability allows the system to be used on uneven surfaces. Thus, the mounting surface shown on FIG. 6 includes surfaces that are on two different parallel planes, the surface labeled as surface 26 being parallel to surface labeled as surface 28.

Figure 7:
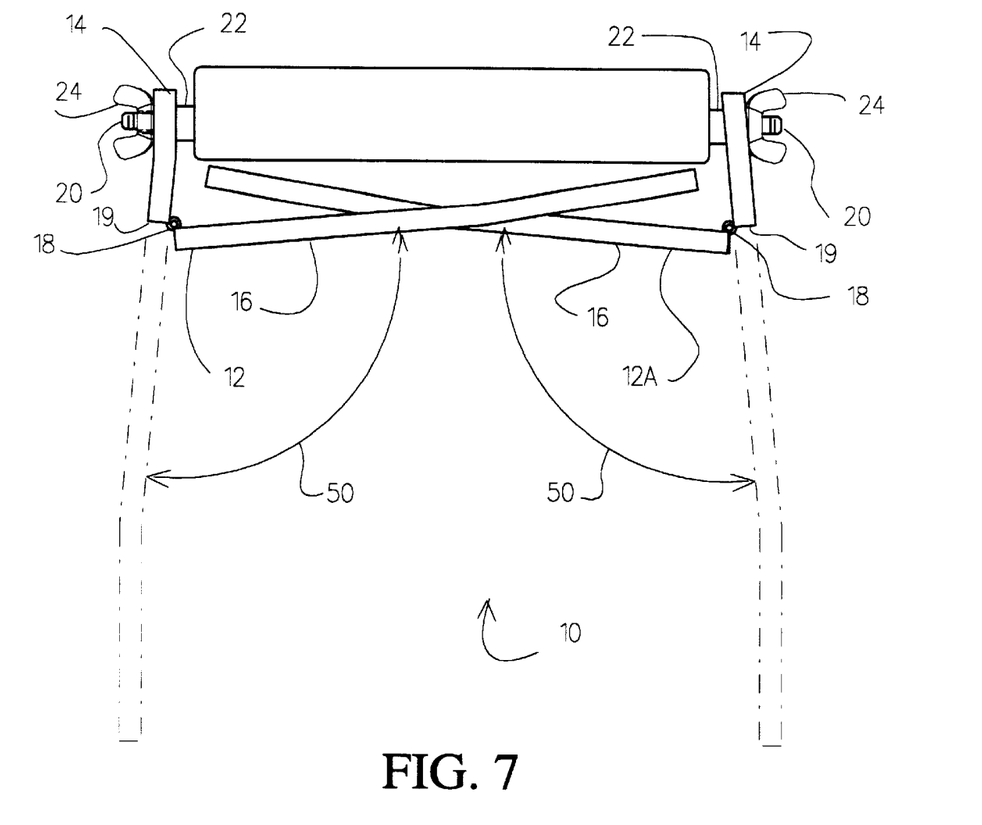
FIG. 7 is a side view illustrating the collapsibility of the legs of the invention.

As shown on FIG. 7, the hinge means 18 of the legs 12 include a flat area 19 which serves as a stop that allows retention of the legs in a generally extended position, shown on FIG. 6, and then allowing folding of the second section 16 of the legs 12 towards the mirror 11, as shown on FIG. 7.

Referring now to FIG. 4, it has been illustrated that attached to the second section 16 of the leg 12 is a support means 30, which in a preferred embodiment includes a first support point 32 and a second support point 34. Also shown on FIG. 4 is that an angle 35 between the leg 12 and a line drawn between the first support point 32 and the second support point 34 is preferably of about 45 degrees. The first support point 32 is spaced apart from the second support point 34, and on the first support point 32 is mounted a magnet 36 which will attach to the mounting surface 37. The second support point 34 will preferably be made of a material that will not harm the mounting surface. Clearly a magnet may also be placed at the second support point 34, however, the preferred embodiment does not include this second magnet since the second magnet would only make it more difficult to remove the device after use and would contribute little to the support of the system. This is due to the fact that the leverage induced by the weight of the mirror on the legs 12 and which is reacted in a heel and toe type of relation between the first support point 32 and the second support point 34. Thus the second support point 34 will transmit primarily compression, bearing type forces and shear forces due to friction to the support source. Therefore, since insignificant tension loads are expected on the second support point 34, it is preferred that a magnet not be incorporated at this location.

Figure 5:
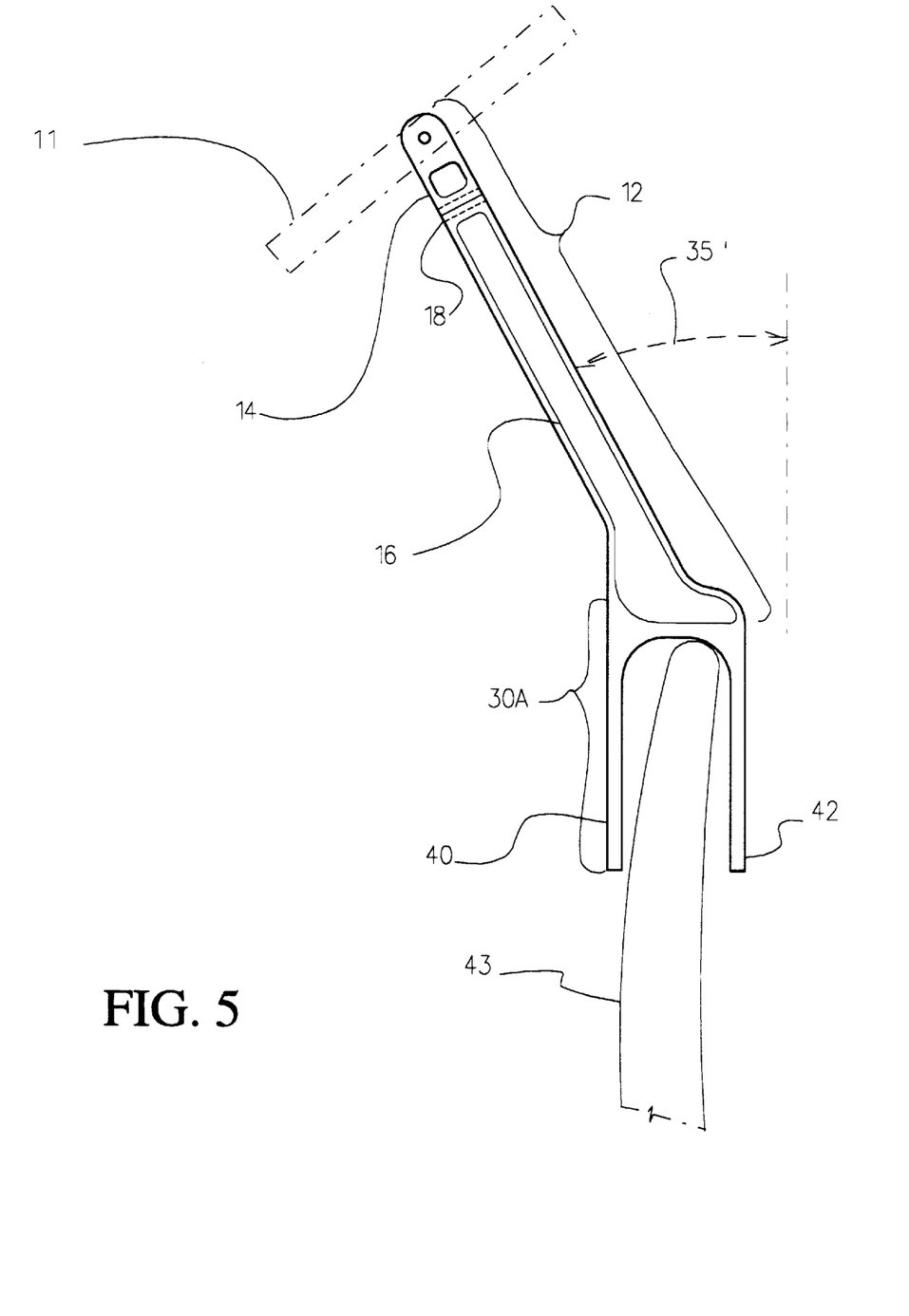
FIG. 5 is a side view of an embodiment of one of the legs of the invention, the embodiment used on the tailgate of a truck.

Referring now to FIG. 5, where a second embodiment of the support means is illustrated and referred to as support means 30A. As has been illustrated in FIG. 5 the support means 30A incorporates a first prong 40 and a second prong 42 which are spaced apart from one another in order to accept a section of the vehicle therebetween. The support means 30A is a part of the second section of the leg 12. The angle 35' between the support means 30A and the leg 12 should be about 28 degrees.

Referring once again to FIG. 6, it can be seen that a preferred embodiment of the invention can be made by attaching a leg 12 to the axial support means 20 and attaching a second leg 12A to the axial support means 20. The second leg 12A being a mirror image of the first leg 12. The attachment of the legs 12 and 12A to the axial support means in accomplished as described above, by means of the wing nuts 24 and shoulder bolts 22. However it is important to note the location of the hinge means 18 along the legs 12 and 12A, and note that the hinge means are preferably placed on a side that allows the legs to fold towards the mirror 11. This arrangement allows the extension of legs 12 and 12A to be limited to the position where the legs are fully extended as shown on FIG. 6, and then allow folding of the legs back to a closed or collapsed position as shown by arrows 50 on FIG. 7.

Figure 9:
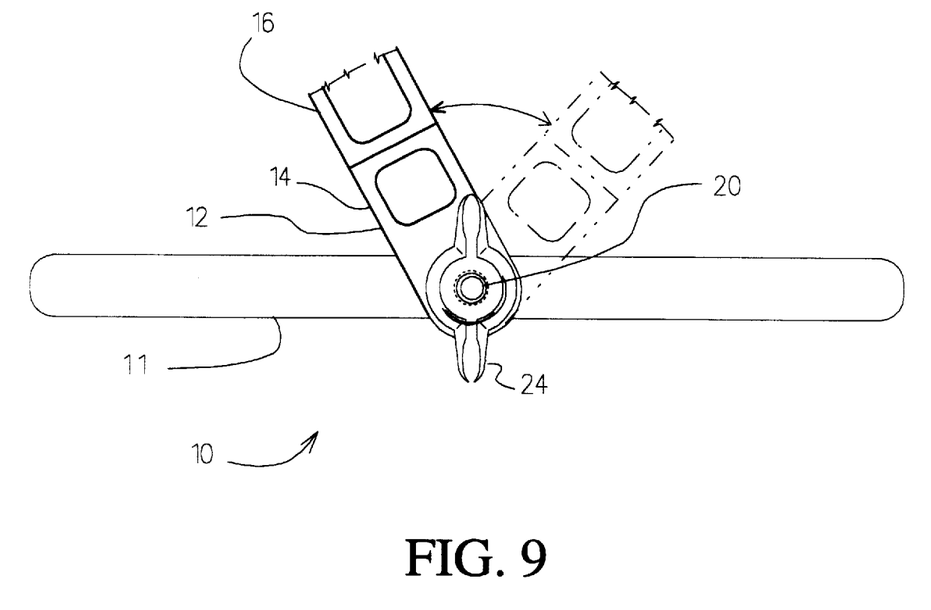
FIG. 9 is a detailed view of the attachment of the legs and the adjustability of the legs relative to the mirror and along an axis of support.

It is also important to note that the use of axial support means 20 to attach the first sections 14 of the legs 12 and 12A to the mirror 11 or structure that supports the mirror since, as shown on FIG. 9, the use of these axial supports allows for significant movement of the legs 12 and 12A relative to the mirror 11.

Figure 8:
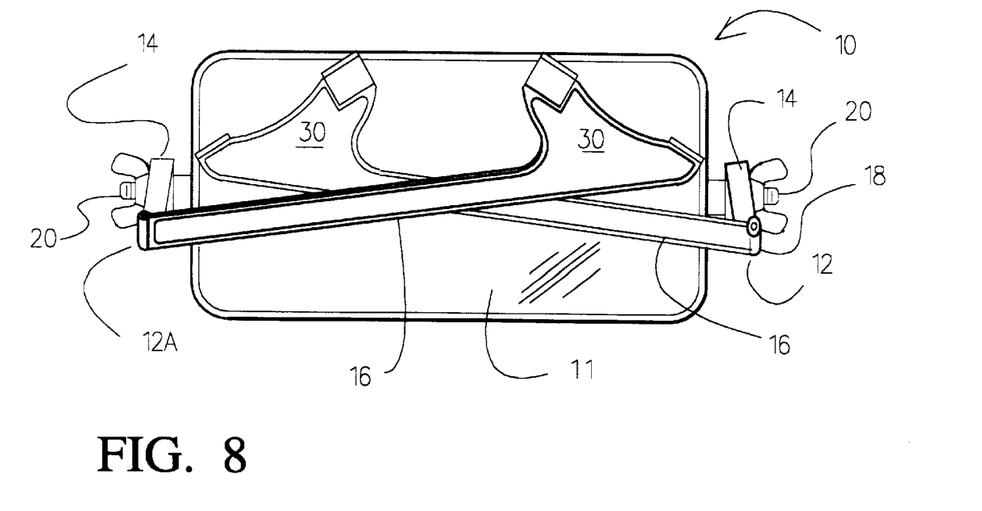
FIG. 8 is a top, plan view of an embodiment the invention, illustrating the enhanced collapsibility of the legs of the invention by means of the use of the pivotal connection on the axial support means that support the mirror about an axis.

The enhanced collapsibility of the legs 12 of the invention 10 has been illustrated on FIG. 8. The collapsibility of the legs 12 and 12A is accomplished by means of a pivotal connection of the first section 14 to the axial support means 20 and the hinge means 18. The pivoting of the first section 14 of legs about the axial support means may be accomplished by simply loosening the wing nut 24 on the axial support means 20. However, it is contemplated that other axial connections, such as spring loaded castellated joints that allow variation of the angle of connection may also be used to support and adjust the mirror about an axis.

It can be appreciated that the highly adjustable legs 12 and 12A of the disclosed mirror support system will allow adjustability that could not be achieved with the devices in the known prior art. Also, the disclosed invention will allow ease of attachment of a mirror for observing the hitch area, regardless of the vehicle on which the hitch system is found.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A support device for temporarily supporting a mirrored surface from a tow vehicle having a towing coupling, the device being mountable against a pair of unparalleled surfaces being removably mountable near the towing coupling in order to allow the viewing of the towing coupling while connecting the towing coupling to an object to be towed, the support device comprising:

a mirror;

axial support means for supporting said mirror about an axis, the axis being approximately coplanar with said mirror;

a first leg having a first section, and a second section, said first section having a first end surface closer to said mirror, and a second end surface away from said mirror, said second section having a third end surface closer to said first section and a fourth end surface away from said first section, the first section being connected to the second section by a hinge means that is mounted adjacent to said second end surface of the first section and said third end surface of said second section and cooperates with said second end surface and said third end surface to allow pivoting of the second section relative to the first section along a pivot axis that is normal to the axis of said axial support means, the pivoting being from a first position where the second section extends over said mirror and said second end surface and said third end surface do not come in contact with each other, and a second position where the second section extends away from the mirror, and said second end surface and said third end surface come in contact with each other, the first section being releasably and independently pivotably attached to said axial support means at an angle that is approximately normal to said axial support means, and the second section further having support means for attaching the second section to a surface of the tow vehicle;

a second leg having a first section, and a second section, the second leg being independent from said first leg, said first section having a first end surface closer to said mirror, and a second end surface away from said mirror, said second section having a third end surface closer to said first section and a fourth end surface away from said first section, the first section of the second leg being connected to the second section of the second leg by a hinge means that is mounted adjacent to said second end surface of the first section and said third end surface of said second section and cooperates with said second end surface and said third end surface to allow pivoting of the second section of the second leg relative to the first section of the second leg along a pivot axis that is normal to the axis of said axial support means, the pivoting being from a first position where the second section of the second leg extends over said mirror and said second end surface and said third end surface do not come in contact with each other, and a second position where the second section extends away from said mirror and said second end surface and said third end surface come in contact with each other, the first section of the second leg being releasably and pivotably attached to said axial support means at an angle that is approximately normal to said axial support means, and the second section of the second leg further having a support means for attaching the second section of the second leg to a surface of the tow vehicle, so that said first leg and said second leg are independently adjustable to allow mounting of the support device against unparallel surfaces, and so that said first leg and said second leg fold over and across said mirror for storage, thereby providing protection for the mirror and providing a reduced footprint for storage.

2. A device according to claim 1, wherein said means for attaching the second section of said first leg and the second section of said second leg to a surface of the tow vehicle comprises a magnetic support means.

3. A device according to claim 1, wherein said means for attaching the second section of said first leg and the second section of said second leg to a surface of the tow vehicle comprises a pair of spaced apart prongs.

4. A device according to claim 1, wherein said means for attaching the second section of said first leg and the second section of said second leg to a surface of the tow vehicle comprises a magnetic support means attached to the second section, the magnetic support means having a first support point and a second support point, the first support point being spaced apart from the second support point, the first support point having a magnet, and the second support point providing bearing support.

5. A device according to claim 2, wherein said axial support means includes means for selectively and independently adjusting the position of said mirror about the axis of support relative to said first leg and said second leg.

6. A device according to claim 5, the hinge means of said first leg and the hinge means of the second leg include a stop that allows retention of the legs in a generally extended position and folding of the second section of said first leg and the second section of said second leg towards said mirror.

7. A support device for temporarily supporting a mirrored surface from a tow vehicle having a towing coupling, the device being removably mountable near the towing coupling in order to allow the viewing of the towing coupling while connection the towing coupling to an object to be towed, the support device comprising:

a mirror having a pair of spaced apart sides;

axial support means for supporting said mirror about an axis, the axis being approximately coplanar with said mirror, and the axial support means extending beyond the pair of spaced apart sides;

a first leg having a first section and a second section, said first section having a first end surface closer to said mirror, and a second end surface away from said mirror, said second section having a third end surface closer to said first section and a fourth end surface away from said first section the first section being connected to the second section by a hinge means that is mounted adjacent to said second end surface of the first section and said third end surface of said second section and cooperates with said second end surface and said third end surface to allow pivoting of the second section relative to the first section along a pivot axis that is normal to the axis of said axial support means, the pivoting being from a first position where the second section extends over said mirror and said second end surface and said third end surface do not come in contact with each other, and a second position where the second section extends away from said mirror and said second end surface and said third end surface come in contact with each other, the first section being releasably and independently pivotally attached to said axial support means at one side of said mirror and at an angle that is approximately normal to said axial support means, and a support means attached to the second section, the support means having first support point and a second support point, the first support point being spaced apart from the second support point, so that a surface of the tow vehicle is accepted between the first support point and the second support point;

a second leg, the second leg being independent from said first leg. the second leg having an inner surface, a first section, and a second section, said first section having a first end surface closer to said mirror, and a second end surface away from said mirror, said second section having a third end surface closer to said first section and a fourth end surface away from said first section, the first section of the second leg being connected to the second section of the second leg by a hinge means that is mounted adjacent to said second end surface of the first section and said third end surface of said second section and cooperates with said second end surface and said third end surface to allow pivoting of the second section of the second leg relative to the first section of the second leg along a pivot axis that is normal to the axis of said axial support means, the pivoting being from a first position where the second section of the second leg extends over said mirror and said second end surface and said third end surface do not come in contact with each other, and a second position where the second section of the second leg extends away from said mirror and said second end surface and said third end surface come in contact with each other, the first section of the second leg being releasably and pivotally attached to said axial support means at the side of said mirror opposite to the side to which the first section of said first leg is attached and is at an angle that is approximately normal to said axial support means, and a support means attached to the second section of the second leg, the support means having first support point and a second support point, the first support point being spaced apart from the second support point, so that a surface of the tow vehicle is accepted between the first support point and the second support point, and so that said first leg and said second leg are independently adjustable on opposite side of said mirror to allow mounting of the support device against unparallel surfaces, and so that said first leg and said second leg fold over and across said mirror for storage, thereby providing protection for the mirror and providing a reduced footprint for storage.

8. A device according to claim 7, wherein said means for attaching the second section of said first leg and the second section of said second leg to a surface of the tow vehicle comprises a pair of spaced apart prongs.

9. A device according to claim 7, wherein the first support point includes a magnetic support means and the second support point providing bearing support.

10. A device according to claim 8, wherein said axial support means includes means for selectively and independently adjusting the position of said mirror about the axis of support relative to said first leg and said second leg.

11. A device according to claim 9, wherein said axial support means includes means for selectively and independently adjusting the position of said mirror about the axis of support relative to said first leg and said second leg.

12. A device according to claim 10, the hinge means of said first leg and the hinge means of the second leg include a stop that allows retention of the legs in a generally extended position and folding of the second section of said first leg and the second section of said second leg towards said mirror.

13. A device according to claim 11, wherein said axial support means includes means for selectively and independently adjusting the position of said mirror about the axis of support relative to said first leg and said second leg.

14. A support device for removably supporting a mirrored surface from a tow vehicle having a towing coupling, the device being temporarily mountable near the towing coupling in order to allow the viewing of the towing coupling while connection the towing coupling to an object to be towed, the support device comprising:

a mirror having a pair of spaced apart sides;

axial support means for supporting said mirror about an axis, the axis being substantially coplanar with said mirror, and the axial support means extending beyond the pair of spaced apart sides;

a first leg having a first section and a second section, said first section having a first end surface closer to said mirror, and a second end surface away from said mirror, said second section having a third end surface closer to said first section and a fourth end surface away from said first section, the first section being connected to the second section by a hinge means that is mounted adjacent to said second end surface of the first section and said third end surface of said second section and cooperates with said second end surface and said third end surface to allow pivoting of the second section relative to the first section along a pivot axis that is normal to the axis of said axial support means, the pivoting being from a first position where the second section extends over said mirror and said second end surface and said third end surface do not come in contact with each other, and a second position where the second section extends away from said mirror and said second end surface and said third end surface come in contact with each other, the first section being releasably and independently pivotally attached to said axial support means at one side of said mirror and at an angle that is approximately normal to said axial support means, and a support means attached to the second section, the support means having first support point and a second support point, the first support point being spaced apart from the second support point, so that a surface of the tow vehicle is accepted between the first support point and the second support point;

a second leg, the second leg being independent from said first leg, the second leg having an inner surface, a first section, and a second section, said first section having a first end surface closer to said mirror, and a second end surface away from said mirror, said second section having a third end surface closer to said first section and a fourth end surface away from said first section, the first section of the second leg being connected to the second section of the second leg by a hinge means that is mounted adjacent to said second end surface of the first section and said third end surface of said second section and cooperates with said second end surface and said third end surface to allow pivoting of the second section of the second leg relative to the first section of the second leg along a pivot axis that is normal to the axis of said axial support means, the pivoting being from a first position where the second section of the second leg extends over said mirror and said second end surface and said third end surface do not come in contact with each other, and a second position where the second section of the second leg extends away from said mirror and said second end surface and said third end surface come in contact with each other, the first section of the second leg being releasably and pivotally attached to said axial support means at the side of said mirror opposite to the side to which the first section of said first leg is attached and is at an angle that is approximately normal to said axial support means, and magnetic support means attached to the second section of the first leg and the second section of the second leg, the magnetic support means having first support point and a second support point, the first support point being spaced apart from the second support point, the first support point having a magnet, and the second support point providing bearing support, so that said first leg and said second leg are independently adjustable to allow mounting of the support device against unparallel surfaces, and so that said first leg and said second leg fold over and across said mirror for storage, thereby providing protection for the mirror and providing a reduced footprint for storage.

15. A device according to claim 14, wherein said axial support means includes means for selectively and independently adjusting the position of said mirror about the axis of support relative to said first leg and said second leg.

16. A device according to claim 15, wherein said axial support means includes means for selectively and independently adjusting the position of said mirror about the axis of support relative to said first leg and said second leg.

* * * * *